(12) United States Patent
Olin

(10) Patent No.: US 10,379,563 B2
(45) Date of Patent: Aug. 13, 2019

(54) SYSTEM, METHOD, MOBILE TERMINAL AND COMPUTER SOFTWARE FOR PROVIDING ELECTRIC ENERGY TO USERS

(71) Applicant: EPSPOT AB, Stockholm (SE)

(72) Inventor: Jan Christian Olin, Stockholm (SE)

(73) Assignee: EPSPOT AB, Stockholm (SE)

( * ) Notice: Subject to any disclaimer, the term of this patent is extended or adjusted under 35 U.S.C. 154(b) by 304 days.

(21) Appl. No.: 15/320,217

(22) PCT Filed: Jun. 25, 2014

(86) PCT No.: PCT/EP2014/063377
§ 371 (c)(1),
(2) Date: Dec. 19, 2016

(87) PCT Pub. No.: WO2015/188891
PCT Pub. Date: Dec. 17, 2015

(65) Prior Publication Data
US 2017/0131733 A1 May 11, 2017

(51) Int. Cl.
*G05F 1/66* (2006.01)
*G06Q 50/06* (2012.01)
*H02J 13/00* (2006.01)

(52) U.S. Cl.
CPC ............... *G05F 1/66* (2013.01); *G06Q 50/06* (2013.01); *H02J 13/0006* (2013.01); *H02J 13/0017* (2013.01)

(58) Field of Classification Search
CPC ........ G05F 1/66; G06Q 50/06; H02J 13/0006; H02J 13/0017

(Continued)

(56) References Cited

U.S. PATENT DOCUMENTS 9,304,566 B2 * 4/2016 Theurer ............... G06F 3/0481
2009/0174365 A1 7/2009 Lowenthal et al.
(Continued)

FOREIGN PATENT DOCUMENTS

CN 101946218 A 1/2011
CN 103093551 A 5/2013
(Continued)

OTHER PUBLICATIONS

Chinese Office Action for Chinese Application No. 2014800801370.
(Continued)

*Primary Examiner* — Duy T Nguyen
(74) *Attorney, Agent, or Firm* — Moore & Van Allen PLLC; W. Kevin Ransom

(57) ABSTRACT

A system for providing electric energy to users includes a server node, a set of supply nodes and a set of mobile terminals. One or more communication networks connect the server node to the supply nodes. Each supply node provides output energy via a remote-controlled outlet. Each mobile terminal communicates with the server node over a wireless interface. The supply nodes repeatedly send respective instruction inquiries to the server node, which also receives activation requests from the mobile terminals specifying a particular outlet and an identity of a mobile-terminal user. In response to an activation request, the server node checks if the user identity is authorized to activate the outlet, and if so; in response to an instruction inquiry from a first supply node associated with the outlet, sends an activation accept to the first supply node enabling output of electric energy from the outlet.

16 Claims, 5 Drawing Sheets

(58) Field of Classification Search
USPC .......................................................... 700/291
See application file for complete search history.

(56) References Cited

U.S. PATENT DOCUMENTS

| | | | |
|---|---|---|---|
| 2009/0177580 A1* | 7/2009 | Lowenthal | B60L 11/1824 |
| | | | 705/39 |
| 2009/0210357 A1* | 8/2009 | Pudar | B60L 11/1816 |
| | | | 705/412 |
| 2011/0191265 A1* | 8/2011 | Lowenthal | B60L 3/12 |
| | | | 705/412 |
| 2013/0110296 A1* | 5/2013 | Khoo | G06F 1/26 |
| | | | 700/286 |
| 2013/0211885 A1* | 8/2013 | Carpinteri | G06Q 30/02 |
| | | | 705/14.1 |
| 2015/0298567 A1* | 10/2015 | Uyeki | B60L 11/1848 |
| | | | 320/155 |

FOREIGN PATENT DOCUMENTS

| | | |
|---|---|---|
| WO | 2009098687 A2 | 8/2009 |
| WO | 2011021973 A1 | 2/2011 |
| WO | 2011094627 A1 | 8/2011 |

OTHER PUBLICATIONS

Chinese Search Report for Chinese Application No. 2014800801370 dated Aug. 16, 2018.
International Preliminary Report on Patentability for PCT/EP2014/063377 dated Dec. 27, 2016.
International Search Report for PCT/EP2014/063377 dated Mar. 6, 2015.

* cited by examiner

SYSTEM, METHOD, MOBILE TERMINAL AND COMPUTER SOFTWARE FOR PROVIDING ELECTRIC ENERGY TO USERS

CROSS-REFERENCE TO RELATED APPLICATION(S)

This application is a national stage application (filed under 35 § U.S.C. 371) of PCT/EP14/063377, filed Jun. 25, 2014 of the same title; the contents of which are hereby incorporated by reference.

BACKGROUND OF THE INVENTION

The present invention relates generally to provision of electric energy to mobile users for sharing on commercial grounds.

Today, an increasing number of apparatuses and devices are powered by electricity. This, per se, creates a strong demand for reliable and efficient supply of electric power. Further, for most consumers, electric power is exclusively available at one single place, namely at the consumer's home, or the address associated with his/her electricity contract. Of course, this is a severe limitation, especially for electric-vehicle drivers who may want to travel a relatively long distance from a point A (say at his/her home) to a point B, where re-fuelling (or rather re-charging of batteries) may be required before continuing.

US 2013/0211885 describes an electricity transfer system, wherein an application programmable interface is configured to communicate with electric vehicle charging stations. The electric vehicle charging stations can be affiliated with an electricity transfer system network and/or the application programmable interface can be configured to administrate the electricity transfer system network. The electricity transfer system network computer system and/or the application programmable interface can be operated by an electricity transfer system network operator, and the electric vehicle charging stations can comprise a multi-use electric vehicle charging station of a private host. Meanwhile, the multi-use electric vehicle charging station is configured to operate in a private mode and a public mode. When the multi-use electric vehicle charging station operates in the private mode, the private host can establish who is able to use the multi-use electric vehicle charging station, and when the multi-use electric vehicle charging station operates in the public mode, the electricity transfer system network operator can establish who is able to use the multi-use electric vehicle charging station. The electricity transfer system network operator can offer one or more incentives to the private host when the multi-use electric vehicle charging station operates in the public mode.

US 2009/0210357 discloses a solution for remote power usage management for plug-in vehicles. Here, the charging of onboard energy storage systems of a plurality of plug-in vehicles is controlled using a remote command center. A system for directing the charging of a plurality of remotely located plug-in vehicles is provided. The system includes a communication system configured to transmit charging authorizations to charge each of the plurality of plug-in vehicles and to receive data related to power consumption from each of the plurality of plug-in vehicles. The system also includes a controller communicatively coupled to the communication system and configured to receive the data related to power consumption and to direct the charge authorizations based thereon. A database is also included in the system and is communicatively coupled to the controller, with the database configured to store the data related to power consumption.

WO 2011/094627 reveals an electric vehicle charging station network, which includes multiple electric vehicle charging stations belonging to multiple charging station hosts. Each host controls one or more charging stations. A charging station network server provides an interface that allows each of the hosts to define one or more pricing specifications for charging electric vehicles on one or more of their electric vehicle charging stations belonging to that host. The pricing specifications are applied to the charging stations such that a cost of charging electric vehicles using those charging stations is calculated according to the pricing specifications.

WO 2011/021973 describes a solution for receiving electricity from an electrical outlet, wherein a pair of receiving entity and power outlet are identified and transmitted to a central system node of an electrical system. In response to the transmission electrical energy can be received from the electrical outlet and billed to the receiving entity. In other words, a single dedicated interface is here provided for control and receiving electricity.

Thus, various solutions exist for selling electric power to electric-car users. However, these solutions are relatively complex and inflexible, particularly in terms of rendering the distribution system available for new customers in a convenient manner. Moreover, none of the known solutions provides an interface to the control server, which enables new suppliers to be added by simple means.

SUMMARY OF THE INVENTION

The object of the present invention is therefore to mitigate the above problems, and thus enable delivery of electric energy at distributed locations in a manner being uncomplicated and straight-forward both for the providers and the consumers.

According to one aspect of the invention, the object is achieved by the initially described system, wherein each supply node is configured to repeatedly send instruction inquiries to the server node. The server node, in turn, is configured to receive activation requests from the mobile terminals. Each activation request specifies a particular outlet of a supply node plus a user identity designating a user of one of the mobile terminals. In response to a received activation request, the server node is configured to check, if the user identity is authorized to activate the specified outlet. Provided that the user identity is found to be authorized, the server node is further configured to send, in response to an instruction inquiry from a first supply node in which the specified outlet is included, an activation accept to the first supply node. Upon receipt in the first supply node, the activation accept is configured to cause the first supply node to enable output of electric energy from the specified outlet.

This system is advantageous because it enables electricity consumers to share electric energy from standard outlets based on communication via standard communication terminals, such as mobile telephones. The proposed system also provides simple and reliable interfaces both between the supply nodes and the server node; and between the server node and the mobile terminals. Consequently, new supply nodes can be added to the system simply by setting up a connection to the server node, for example over the Internet. Authorized consumers may likewise communicate with the server node over the Internet, and thus remote control the electric outlets of the supply nodes.

According to one preferred embodiment of this aspect of the invention, the activation request includes an identity string uniquely identifying the specified outlet. The identity string is adapted to be included in the activation request in connection with generating the activation request. To this aim, the first supply node contains data representing the identity string in the form of: alphanumerical information adapted to be read by a user and fed manually into the mobile terminal, an optical code adapted to be automatically read into the mobile terminal via a scanner means, and/or an amount of data configured to be transferred to the mobile terminal via a short-range radio interface, e.g. in accordance with the NFC standard (NFC=Near Field Communication). Thereby, a user may conveniently inform the server node of outlet he/she wishes to activate.

According to another preferred embodiment of this aspect of the invention, the activation request specifies a future point in time at which the user wishes to gain access to electric energy via the specified outlet. Here, the activation request also specifies a time period during which the user wishes to consume electric energy from the specified outlet. Hence, users can make reservations at locations where it is expected that electric energy is needed, for example to re-charge batteries.

Further preferably, in response to an activation request specifying a future point in time at which the user wishes to gain access to electric energy via the specified outlet, the server node is configured to check whether the specified outlet is available for the user identity associated with the activation request at the particular future point in time. If so, the server node is configured to reserve the specified outlet at the indicated point in time for the user in question. Depending on certain parameters (e.g. user profile, type of outlet, demand for that particular outlet) set in the server node the reservation may be associated with a cost for the user, which cost, in turn, may depend on time of day, duration etc.

According to yet another preferred embodiment of this aspect of the invention, the first supply node includes circuitry configured to register an impedance measure in respect of each of its associated outlets. The first supply node also contains a first trigger module, which is configured to generate an inquiry specifying the particular outlet in response to a registered impedance measure indicating that an electric plug has been inserted into this outlet of the node.

Alternatively, or as a complement, the first supply node may contain short-range radio interface (e.g. of NFC type) configured to, via electromagnetic-field fluctuations, detect the presence of a mobile terminal in proximity to a particular one of the supply node's outlets. Here, a second trigger module in the first supply node is configured to generate an inquiry specifying outlet in response to a mobile terminal being detected by the short-range radio interface. Thus, a user may select an outlet to activate in a very convenient manner.

According to a further preferred embodiment of this aspect of the invention, the inquiry from the supply node to the server node also contains the activation request. In response to the inquiry, the server node is configured to establish communication with the user terminal via the short-range radio interface. Thereby, it is not necessary for the user terminal to set up a separate connection to the server node (e.g. over the Internet), which, in turn, enables consumption of electric energy at locations where users cannot communicate via conventional land-based communication systems, for instance onboard ships at sea.

According to another preferred embodiment of this aspect of the invention, the server node is configured to prompt (e.g. via an online interface) the user of the mobile terminal to accept a tariff for consuming electric energy via the specified outlet before sending the activation accept to the first supply node. Hence, individual and/or time-dependent tariffs may be implemented in a straightforward manner.

According to still another preferred embodiment of this aspect of the invention, in connection with outputting electric energy from the specified outlet, the first supply node is configured to send one or more status reports to the server node. Such a report is issued at least after completing an output session to summarize the amount of energy delivered. However, preferably, status reports are also issued at other instances, e.g. repeatedly in parallel with the delivery of electricity. In any case, the status report contains data concerning the specified outlet and an amount of energy consumed during a specific time period, for example since any previous report.

According to still another aspect of the invention, the object is achieved by the method described initially, wherein, the method involves: repeatedly sending instruction inquiries from each supply node to a server node; receiving, in the server node, an activation request from a mobile terminal, the activation request specifying a particular one of said outlets and a user identity designating a user of the mobile terminal; checking, in response to the activation request, if the user identity is authorized to activate the specified outlet, and provided that said user identity is found to be authorized sending, in response to an instruction inquiry from a first supply node in which the specified outlet is included, an activation accept to the first supply node, the activation accept being configured to upon receipt in the first supply node cause the first supply node to enable output of electric energy from the specified outlet. The advantages of this method, as well as the preferred embodiments thereof, are apparent from the discussion above with reference to the proposed system.

According to a further aspect of the invention the object is achieved by a computer program product, which is loadable into the memory of a computer, and includes software adapted to implement the method proposed above when said computer program product is run on a computer.

According to another aspect of the invention, the object is achieved by the mobile terminal described initially, wherein the mobile terminal is configured to: receive user input specifying a particular remote-controlled outlet being associated with a supply node, which supply node is configured to receive electric energy from an external power source and based thereon provide output energy via said outlet, the supply node being connected to the server node via at least one communication network; and send an activation request to the server node based on said user input, the activation request specifying said outlet and a user identity designating a user of one of the mobile terminals, and the activation request being configured to cause the server node to check if the user identity is authorized to activate the specified outlet, and provided that the user identity is found to be authorized send an activation accept to the first supply node, the activation accept being configured to upon receipt in the first supply node cause the first supply node to enable output of electric energy from the specified outlet. The advantages of this mobile terminal are likewise apparent from the discussion above with reference to the proposed system.

Further advantages, beneficial features and applications of the present invention will be apparent from the following description.

BRIEF DESCRIPTION OF THE DRAWINGS

The invention is now to be explained more closely by means of preferred embodiments, which are disclosed as examples, and with reference to the attached drawings.

DESCRIPTION OF THE INVENTION

Figure 1:
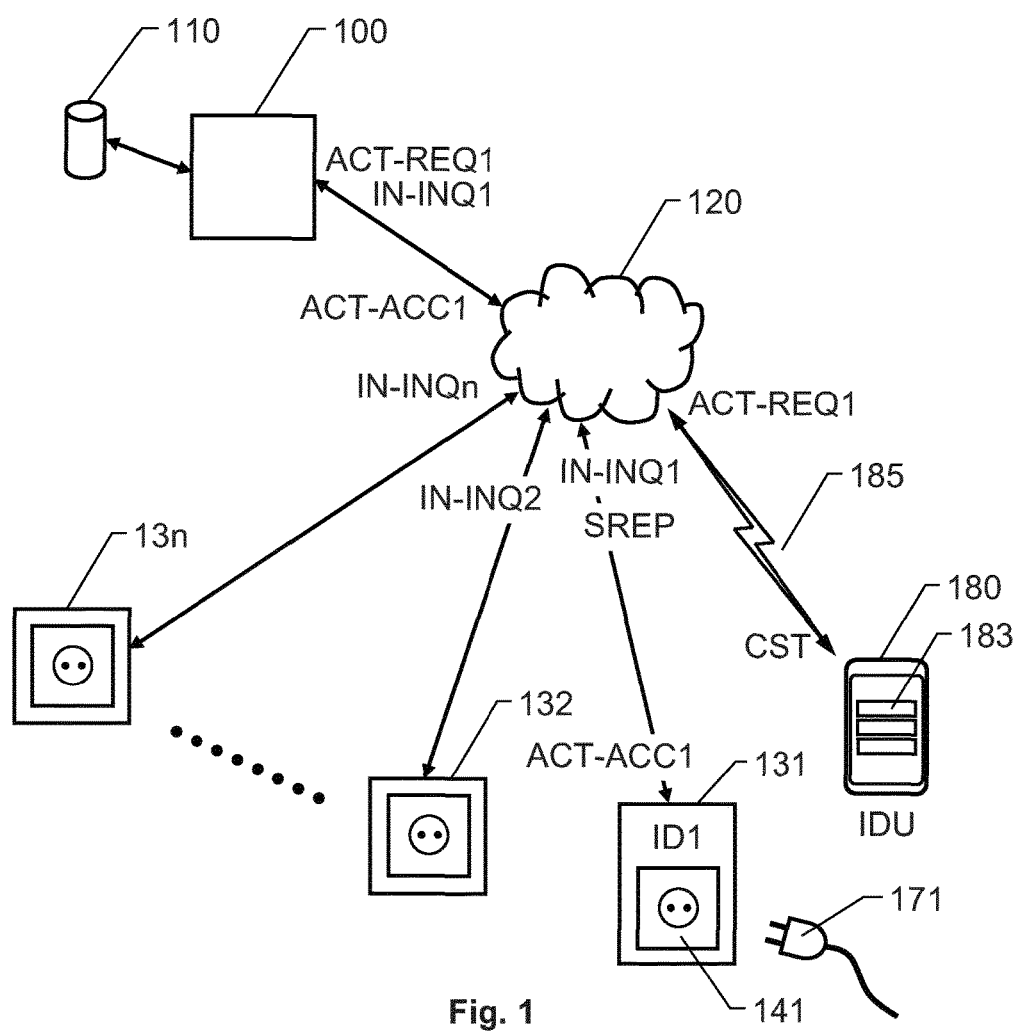
FIG. 1 shows an example of a system according to one embodiment of the invention.

In FIG. 1, we see an overview of an example of a system for providing electric energy to users according to one embodiment of the invention.

We here presume that each user has a mobile terminal 180 configured to exchange data over at least one wireless interface. Thus, the mobile terminal 180 may be represented by a mobile/cellular telephone (e.g. a so-called smartphone), a PDA (Personal Digital Assistant) or palmtop computer, a phablet, a tablet computer, a laptop etc. It is further assumed that the user has electric equipment at his/her disposal, which, at least occasionally, requires energy from an electric outlet.

In addition to the mobile terminal 180, the system includes: a server node 100, a set of supply nodes 131, 132 and 13n and at least one communication network 120. Each supply node 131, 132 and 13n is communicatively connected to the server node 100 via the at least one communication network 120, which for example may be represented by the Internet and various forms of wired and wireless access networks. Each supply node 131, 132 and 13n is also configured to receive electric energy from an external power source and based thereon provide output energy via at least one remote-controlled outlet 141 associated with the supply node 131.

For clarity reasons FIG. 1 only shows one mobile terminal 180. However, the proposed system preferably includes a relatively large set of mobile terminals 180, typically one per user, each of which terminal is configured to communicate with the server node 100 over a wireless interface 185, and for example at least one additional communication network, e.g. 120.

According to the invention, the server node 100 is preferably connected to the supply nodes 131, 132 and 13n in a LAN-based manner (LAN=Local Area Network). Since, typically, LAN:s are protected by firewalls an external server is prevented from accessing a given node inside a LAN. Given this assumption, the server node 100 cannot simply contact a supply node whenever required. Therefore, each supply node 131, 132 and 13n is configured to repeatedly send instruction inquiries IN-INQ1, IN-INQ2 and IN-INQn to the server node 100, for instance with regular intervals. The intervals are preferably variable in response to instructions from the sevrer node 100 received in connection with a supply node "checking in" with the server node 100. One example of such a check in is the below-described activation request. The contact frequency between the server node 100 and a particular supply node depends on an expected/anticipated activity in respect of one or more of the outlets associated with this supply node. The contact frequency is a trade-off between avoiding unnecessary data traffic and providing the users with a satisfying service responsiveness. If for example a particular outlet is not presently in use and it is not estimated that the outlet will to be in use within a near future either, the associated supply node is preferably set in sleep mode. This means that the interval between consecutive contacts between the supply node and the server node 100 may be relatively long, say one hour. Namely, this is sufficient to report status and calibrate the clock in the supply node. However, if an outlet is in use, or is expected to be used soon, the intervals are preferably much shorter, say in the order of 5 seconds, so that an acceptable responsiveness is attained.

According to the invention, a user who wants to activate a particular electric outlet 141 indicates this by sending activation request ACT-REQ1 from his/her mobile terminal 180 to the server node 100. The server node 100 is therefore configured to receive activation requests ACT-REQ1 from the mobile terminals 180, where each activation request ACT-REQ1 specifies a particular outlet 141. Each activation request ACT-REQ1 also specifies a user identity IDU uniquely designating the user of the mobile terminal 180.

According to one preferred embodiment of the invention, the activation request ACT-REQ1 contains an identity string ID1 uniquely identifying the specified outlet 141, which identity string ID1 is adapted to be included in the activation request ACT-REQ1 in connection with generating the activation request ACT-REQ1. To this aim, the supply node 131 may contain data representing the identity string ID1 in the form of alphanumerical information adapted to be read by the user and be fed manually into the mobile terminal 180 when generating the activation request ACT-REQ1. Alternatively, or as a complement, the supply node 131 may contain data representing the identity string ID1 in the form of an optical code adapted to be automatically read into the mobile terminal 180 via an optical scanner means, e.g. integrated into the mobile terminal 180. Furthermore, as will be discussed below with reference to FIG. 3, the identity string ID1 may be included in the activation request ACT-REQ1 via a short-range radio interface 380.

In response to a received activation request ACT-REQ1, the server node 100 is configured to check if the user identity IDU is authorized to activate the specified outlet 141. This checking may be effected by using a database 110 over registered users, which database 110 is communicatively connected to the server node 100.

Provided that the user identity IDU is found to be authorized, the server node 100 is configured to send an activation accept ACT-ACC1 to the supply node 131 in which the specified outlet 141 is included. As discussed above, the activation accept ACT-ACC1 is sent in response to an instruction inquiry IN-INQ1 from the supply node 131. In response to the activation accept ACT-ACC1, the supply node 131 is configured to enable output of electric energy from the specified outlet 141. Details concerning this procedure will be described below with reference to FIG. 2.

According to one embodiment of the invention the activation request ACT-REQ1 specifies a future point in time at which the user wishes to gain access to electric energy via the specified outlet 141. The activation request ACT-REQ1 also specifies a time period during which the user wishes to consume electric energy from the specified outlet 141. Thus, the user can make a reservation at a location where he/she expects that electric energy is needed, for example to re-charge the batteries of an electric-powered apparatus/device. To this aim, the mobile terminal 180 preferably contains a user interface 183 configured to present information concerning the supply nodes 131, 132 and 13n and their respective schedules. It is further advantageous if the user interface 183 is configured to receive user input specifying the particular remote-controlled outlet 141 that he/she wishes to activate, either now or some time in the future.

In response to the activation request ACT-REQ1 specifying a future point in time at which the user wishes to gain access to electric energy via the specified outlet 141, the server node 100 is configured to check whether or not this outlet 141 is available for the user identity IDU associated with the activation request ACT-REQ1 at this future point in time. If (and only if) the outlet 141 is available, the server node 100 is configured to make a reservation for the user identity IDU with the specified outlet 141 at the requested future point in time.

According to one preferred embodiment of the invention, in connection with outputting electric energy from an outlet 141, the supply node 131 is configured to send at least one status report SREP to the server node 100. The status report SREP contains data concerning the specified outlet 141 and an amount of energy consumed during a specific time period, preferably since a latest previous status report SREP was issued in respect of the outlet 141. Thus, a status report SREP is always sent out after having completed a particular output session. In addition to that, status report SREP are preferably also generated repeatedly during an ongoing output session, say at intervals of 1 to 10 seconds.

Figure 2:
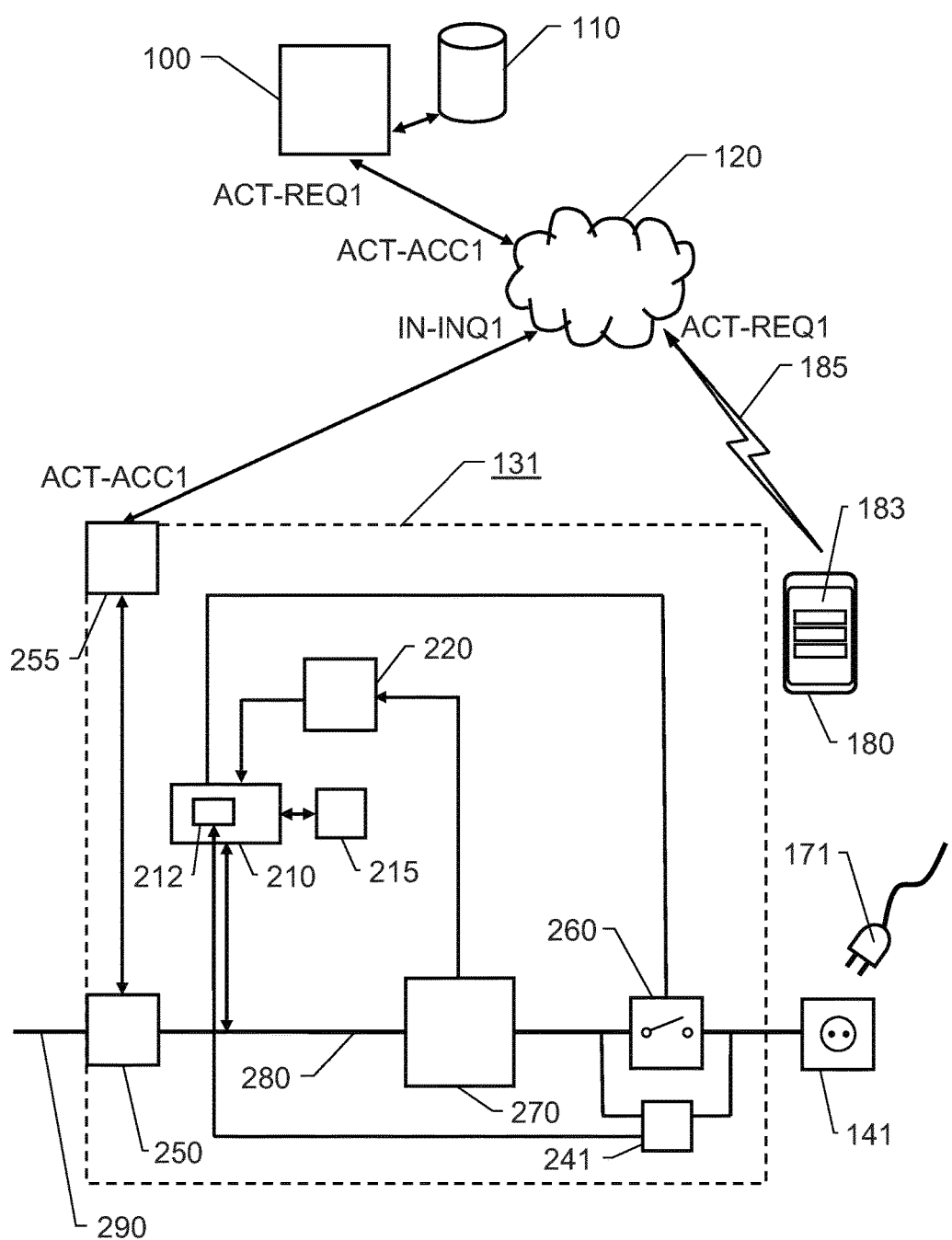
FIG. 2 illustrates details of a supply node according to a first embodiment of the invention.

FIG. 2 illustrates further details of a supply node 131 according to a first embodiment of the invention.

As mentioned above, each supply node 131, 132 and 13n is configured to receive electric energy from an external power source. In FIG. 2, this is symbolized by an input power line 290. The input power line 290, in turn, is typically represented by a power grid. However, the input electric power may equally well originate from a standalone source of energy, e.g. a set of solar panels or a generator. In any case, the supply node 131 is configured to provide output electric energy based on the input energy from the external power source 290 via at least one remote-controlled outlet 141 associated with the node 131.

To enable communication between the supply node 131 and the server node 100 (e.g. in respect of the activation accept ACT-ACC1), the supply node 131 preferably includes a network interface 255 configured to be connected to the at least one communication network 120. In the embodiment shown in FIG. 2, the supply node 131 also contains a powerline-to-Ethernet converter 250, e.g. a so-called PLC (powerline communication) unit, configured to exchange data over standard powerlines. Especially if the supply node 131 controls more than one outlet 141, it is preferable if a powerline-to-Ethernet converter 250 is included. Namely, this renders it possible for the processing unit 210 to control and/or supervise a plurality of individual outlets via an internal powerline system 280, e.g. in an edifice implementing the supply node 131; and at the same time, connect securely to the server node 110 via the at least one communication network 120. In any case, the network interface 255, in turn, is communicatively connected to a processing unit 210, which is configured to supervise and control the operation of the supply node 131. To this aim, the processing unit 210 is further preferably associated with a memory module 215 storing software for controlling the processing unit 210.

The supply node 131 receives electric energy from an external power source 290 and based thereon provides output energy via the outlet 141 (and any outlets in addition thereto). Here, however, the processing unit 210 is configured to control a switch 260 via a separate control line, so that electric energy from the internal power line 280 is either allowed or prevented from passing out via the outlet 141.

A power meter 270 on the internal powerline 280 is arranged to register the amount of energy passing out via the outlet 141, and report corresponding data to the processing unit 210, preferably via an optical converter 220, such that the processing unit 210 is galvanically isolated from the outlet 141.

Preferably, in order to enable a user to indicate that he/she wishes to buy electricity via a particular supply node, the supply node is provided with means for waking up (or activating) the supply node should it be operating in a sleep mode. Of course, the wake-up means may include a manual input member, such as a key, button or a lever.

However, according to one preferred embodiment of the invention, the supply node 131 includes circuitry 241 configured to register an impedance measure in respect of each of its associated outlets 141. The circuitry 241, in turn, may contain a large impedance and a voltage and current meter arranged parallel with the switch 260 for allowing/preventing electric energy to pass out through the outlet 141.

A first trigger module 212 in the supply node 131 is configured to generate an inquiry IN-INQ1 in response to a registered impedance measure indicative of an electric plug 171 having been inserted into the outlet 141. The inquiry IN-INQ1 specifies the outlet 141 and thus informs the server node 100 of the fact that a user is interested in taking out electric energy from that particular outlet 141 associated with the supply node 131. As a result, the contact frequency between the server node 100 and the supply node 131 may be set to a relatively high value so as to meet the requirement of good responsiveness for user interaction.

Figure 3:
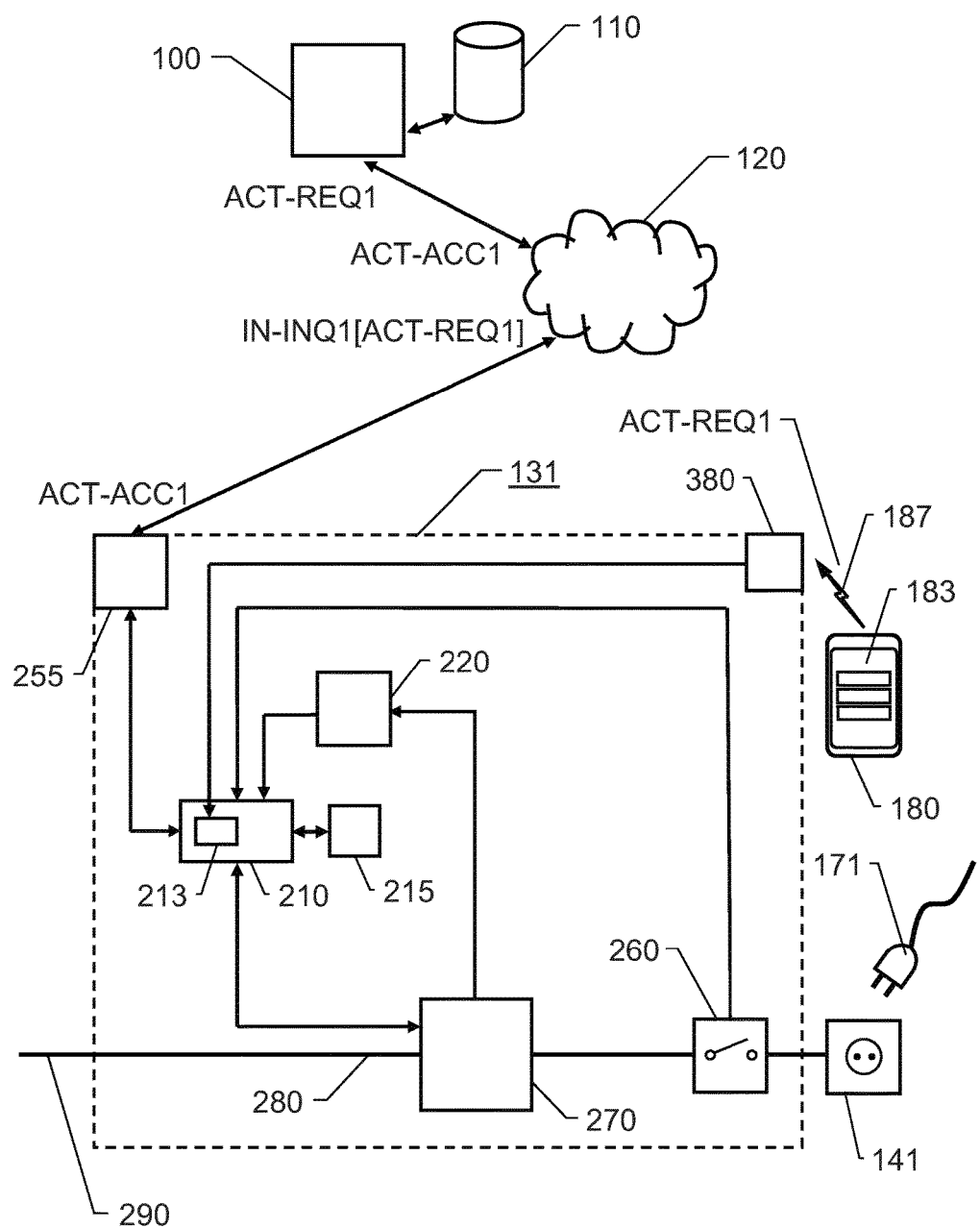
FIG. 3 illustrates details of a supply node according to a second embodiment of the invention.

FIG. 3 illustrates details of a supply node 131 according to a second embodiment of the invention. Here, all elements, units and messages bearing the same reference labels as described above with reference to FIG. 2 designate the same elements, units and messages as in FIG. 2. For illustrating purposes, in the embodiment shown in FIG. 3, the supply node 131 does not include any powerline-to-Ethernet converter. Therefore, instead, the processing unit 210 is arranged to communicate internally in the supply node 131 exclusively via dedicated data lines.

Moreover, in FIG. 3, the supply node 131 includes a short-range radio interface 380 (e.g. of NFC type) configured to detect the presence of a mobile terminal 180 in proximity to the outlet 141 via electromagnetic-field fluctuations 187. A second trigger module 213 in the supply node 131 is configured to generate an inquiry IN-INQ1 [ACT-REQ1] in response to a mobile terminal 180 being detected by the short-range radio interface 380. Analogous to the above, the inquiry IN-INQ1[ACT-REQ1] specifies the particular outlet 141. Preferably, however, the inquiry IN-INQ1[ACT-REQ1] also contains the activation request ACT-REQ1, i.e. the mobile-terminal initiated message that inter alia informs the server node 100 of the user identity IDU. Namely, it is relatively straightforward to forward information based upon which the activation request ACT-REQ1 can be generated over a short-range radio interface 380 such as NFC.

Provided that the inquiry IN-INQ1[ACT-REQ1] contains the activation request ACT-REQ1, the server node 100 is configured to, in response to the inquiry IN-INQ1[ACT-REQ1], establish communication with the mobile terminal 180 via said short-range radio interface 380. Thus, it is not necessary to set up the previously mentioned wireless interface 185 in the mobile terminal 180. Instead, the mobile terminal 180 can communicate with the server node 100 via the radio interface 380, the processing unit 210, the power-line-to-Ethernet unit 285, the modem 285 and the at least one communication network 120.

As mentioned above, the activation request ACT-REQ1 specifies the outlet 141, preferably via an identity string ID1 included in the activation request ACT-REQ1 in connection with generating the activation request ACT-REQ1. Given that the supply node 131 includes a short-range radio interface 380, the supply node 131 preferably also contains data representing the identity string ID1 in the form of an amount of data configured to be transferred to the mobile terminal 180 via the short-range radio interface 380. Namely, thereby the user may indicate to the server node 100 that he/she wishes to activate a particular outlet 141 in a very convenient manner. In practice, it may be sufficient to merely activate the user interface 183 and position the mobile terminal 180 in proximity to the short-range radio interface 380 in order to issue the activation request ACT-REQ1 and set up communication with the server node 100.

Irrespective of how the activation request ACT-REQ1 is generated, according to one preferred embodiment of the invention, before sending the activation accept ACT-ACC1 to the supply node 131, the server node 100 is configured to prompt CST, e.g. via the user interface 183, the user to accept a tariff for consuming electric energy via the specified outlet 141. Of course such prompting may also be effected via a contractual agreement in the user's subscription to the service associated with the proposed system. In any case, this prompting provides a basis for billing the user, or withdrawing funds from an account linked to the user.

The user interface 183 may be implemented in the mobile terminal 180 via software in the form of a so-called app, which, in turn, preferably is written in a native language of the mobile terminal 180. This software may be downloaded into the mobile terminal 180 from a network server, e.g. App Store™, Android Market™, Amazon Appstore™, or similar. Alternatively, the user interface 183 can be presented as a HTML5 (WEB2.0) application in a web browser of the mobile terminal 180.

In any event, after having installed said software in the mobile terminal 180, the mobile terminal 180 is configured to receive user input specifying a particular remote-controlled outlet 141 that is associated with a supply node 131. The supply node 131 is presumed to be configured to receive electric energy from an external power source 290, and based thereon provide output energy via said outlet 141. As described above, the supply node 131 is connected to the server node 100 via at least one communication network 120.

Moreover, after having installed said software in the mobile terminal 180, the mobile terminal 180 is configured to send an activation request ACT-REQ1 to the server node 100 based on the user input. The activation request ACT-REQ1 specifies the outlet 141 plus a user identity IDU designating the user. The activation request ACT-REQ1 is configured to cause the server node 100 to check if the user identity IDU is authorized to activate the specified outlet 141, and provided that the user identity IDU is found to be authorized, send an activation accept ACT-ACC1 to the first supply node 131. Upon receipt in the first supply node 131, the activation accept ACT-ACC1 is configured to cause the first supply node 131 to enable output of electric energy from the specified outlet 141.

Figure 4:
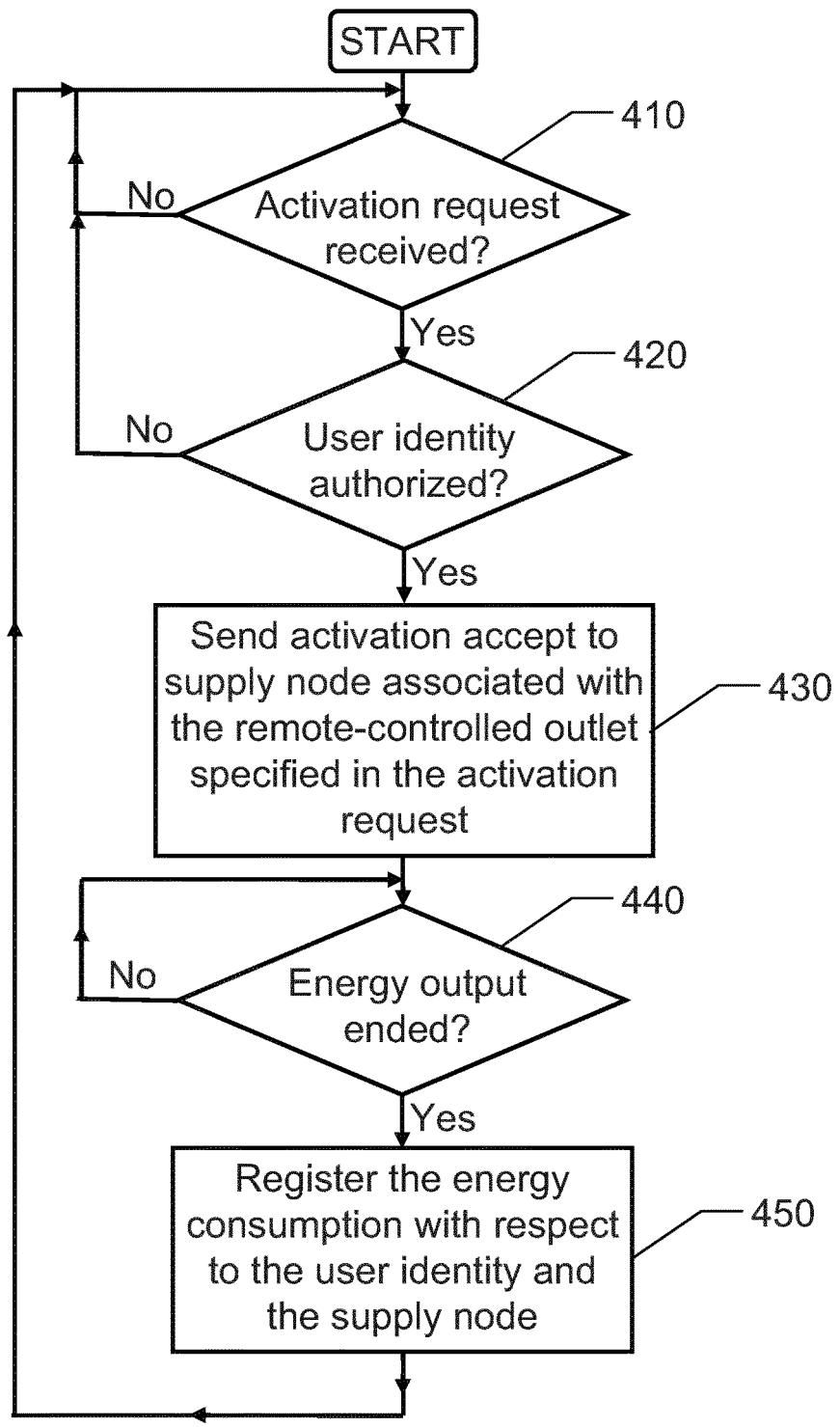
FIG. 4 illustrates, by means of a flow diagram, the general method according to the invention.

To sum up, and with reference to the flow diagram in FIG. 4, we will now describe the general method of delivering electric energy to users via supply nodes according to the invention.

In a first step 410, it is checked whether an activation request has been received in respect of a certain node. The activation request specifies a particular one of the supply node's outlets and a user identity IDU designating a user of a mobile terminal 180. If such an activation request has been received, a step 420 follows, and otherwise the procedure loops back and stays in step 410.

As mentioned above, the server node can only communicate with the specified supply node if also an instruction inquiry has been received from this node; and the frequency at which such instruction inquiries arrives may vary substantially over time. Below, we will explain how this circumstance can be handled with reference to steps 515 and 517 of FIG. 5.

In step 420 it is checked whether the user identity IDU is authorized to activate the specified outlet. If the user identity IDU is found to be authorized, a step 430 follows. Otherwise, the procedure loops back to step 410.

In step 430, an activation accept is sent to the supply node associated with specified outlet. The activation accept is configured to, upon receipt in the supply node, cause this node to enable output of electric energy from the specified outlet. Thus, it is then assumed that the user starts to withdraw electricity from the outlet, for example by charging one or more batteries. Therefore, a subsequent step 440 checks if the output of energy has ended. If so, a step 450 follows; and otherwise the procedure loops back and stays in step 440.

In step 450, an energy consumption with respect to the user identity IDU and the supply node is registered in the server node. Then, the procedure loops back to step 410.

Figure 5:
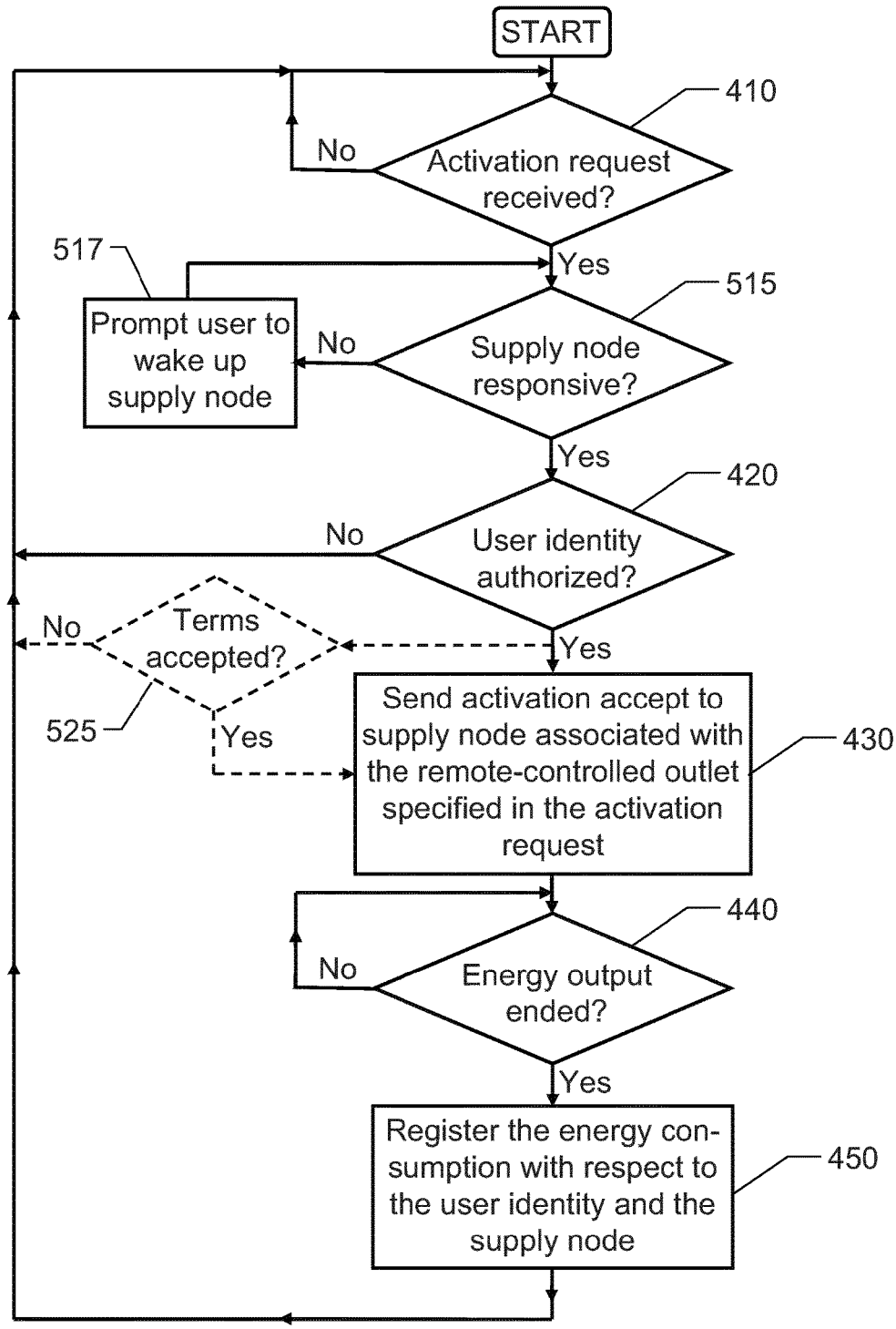
FIG. 5 illustrates, by means of a flow diagram, the method according to one preferred embodiment of the invention.

FIG. 5 shows a flow diagram illustrating the method according to one preferred embodiment of the invention. Here, the steps bearing the same reference labels as described above with reference to FIG. 4 designate the same operations as those described above.

A step 515 between steps 410 and 420 checks whether or not the specified supply node is deemed to be sufficiently responsive for the procedure to follow. For example, if the specified supply node already sends out instruction inquiries at a relatively high frequency to the server node, say at intervals in the order of 5 to 10 seconds, the supply node is considered to be sufficiently responsive. Step 420 therefore follows. If, however, specified supply node has not been used recently and thus has been set to a sleep mode, wherein it sends out instruction inquiries being separated in time by relatively long intervals, say in the order of 10 to 20 minutes; then the procedure continues to step 517.

In step 517 information is presented to the user (e.g. via the user interface 183), which information is aimed to prompt the user to take such actions that the supply node wakes up and starts sending out instruction inquiries more frequently. As described above, the supply node can be woken up by inserting an electric plug into an electric outlet of the supply node, and/or by activating a short-range radio interface thereof. After step 517, the procedure loops back to step 515 to test if the supply node's responsiveness has reached an acceptable level.

FIG. 5 also shows an optional step 525 between steps 420 and 430. Step 525 involves checking if the user has accepted the terms for consuming electricity from the specified supply node. As mentioned earlier, the terms may either be accepted in advance by the user via a service agreement, or the user may be prompted by the server node to explicitly accept the applicable tariff in connection with a given buying opportunity. Provided that the user accepts the terms, step 430 follows. Otherwise, the procedure loops back to step 410.

The process steps described above with reference to FIGS. 4 and 5, as well as any sub-sequence of steps, may be controlled by means of a programmed computer apparatus. Moreover, although the embodiments of the invention described above with reference to the drawings comprise a computer apparatus and processes performed in a computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semi-conductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A system for providing electric energy to users, the system comprising:
   a server node;
   a set of supply nodes, wherein each of said supply nodes is configured to receive electric energy from an external power source and based thereon, provide output energy via at least one remote-controlled outlet associated with the supply node;
   at least one communication network connecting the server node to each of said supply nodes; and
   a set of mobile terminals, each of which is configured to communicate with the server node over a wireless interface,
   wherein each supply node of said set of supply nodes is configured to repeatedly send instruction inquiries to the server node,
   wherein the server node is configured to:
      receive activation requests from said mobile terminals, each activation request specifying a particular one of said remote-controlled outlets and a user identity designating a user of one of said mobile terminals;
      check, in response to a received activation request, that the user identity is authorized to activate the specified remote-controlled outlet; and
      provided that said user identity is found to be authorized, send, in response to an instruction inquiry from a first supply node of said set of supply nodes in which the specified remote-controlled outlet specified in the activation request is included, an activation accept to the first supply node, the activation accept being configured to, upon receipt by the first supply node, cause the first supply node to enable output of electric energy from the specified remote-controlled outlet specified in the activation request, and
   wherein the first supply node comprises:
      circuitry configured to register an impedance measure in respect to each remote-controlled outlet associated with the first supply node; and
      a first trigger module configured to generate an inquiry in response to a registered impedance measure indicative of an electric plug being inserted into a particular one of said remote-controlled outlet associated with the first supply node, the inquiry specifying said particular remote-controlled outlet.

2. The system according to claim 1, wherein said activation request comprises an identity string uniquely identifying the specified remote-controlled outlet specified in the activation request and adapted to be included therein in connection with generating said activation request, the first supply node containing data representing the identity string in the form of at least one of:
   alphanumerical information adapted to be read by a user and fed manually into the mobile terminal;
   an optical code adapted to be automatically read into the mobile terminal via a scanner means; and
   an amount of data configured to be transferred to the mobile terminal via a short-range radio interface.

3. The system according to claim 1, wherein the activation request specifies a future point in time at which the user wishes to gain access to electric energy via the specified remote-controlled outlet, the activation request further specifying a time period during which the user wishes to consume electric energy from the specified remote-controlled outlet specified in the activation request.

4. The system according claim 3, wherein the server node, in response to said activation request specifying a future point in time at which the user wishes to gain access to electric energy via the specified remote-controlled outlet specified in the activation request, is configured to:
   check whether the specified remote-controlled outlet specified in the activation request is available for the user identity associated with said activation request at said future point in time; and
   make a reservation for said user identity with the specified remote-controlled outlet specified in the activation request at said future point in time.

5. The system according to claim 1, wherein the first supply node comprises:
   a short-range radio interface configured to detect the presence of a mobile terminal in proximity to a particular one of said remote-controlled outlets of one of said supply nodes via electromagnetic-field fluctuations; and
   a second trigger module configured to generate an inquiry in response to a mobile terminal being detected by the short-range radio interface, the inquiry specifying said particular remote-controlled outlet.

6. The system according to claim 5, wherein:
the inquiry comprises said activation request; and
in response to the inquiry, the server node is configured to establish communication with the user terminal via said short-range radio interface.

7. The system according to claim 1, wherein before sending the activation accept to the first supply node, the server node is configured to prompt the user of the mobile terminal to accept a tariff for consuming electric energy via the specified remote-controlled outlet specified in the activation request.

8. The system according to claim 7, wherein, in connection with electric energy being output of from the specified remote-controlled outlet specified in the activation request, the first supply node is configured to send at least one status report to the server node, the at least one status report comprising data concerning the specified remote-controlled outlet and amount of energy consumed during a specific time period.

9. A method of delivering electric energy to users via a set of supply nodes, wherein each supply node of said set of supply nodes is configured to receive electric energy from an external power source and based thereon, provide output energy via at least one remote-controlled outlet associated with the supply node, the method comprising:
repeatedly sending instruction inquiries from each of said supply nodes of said set of supply nodes to a server node;
receiving in the server node an activation request from a mobile terminal, the activation request specifying a particular one of said remote-controlled outlets and a user identity designating a user of the mobile terminal;
checking, in response to the activation request, that the user identity is authorized to activate the specified remote-controlled outlet specified in the activation request;
provided that said user identity is found to be authorized, sending, in response to an instruction inquiry from a first supply node of said set of supply nodes in which the specified remote-controlled outlet specified in the activation request is included, an activation accept to the first supply node, the activation accept being configured to, upon receipt by the first supply node, cause the first supply node to enable output of electric energy from the specified remote-controlled outlet specified in the activation request;
registering an impedance measure in respect to each remote-controlled outlet associated with the first supply node; and
generating an inquiry in response to a registered impedance measure indicative of an electric plug being inserted into a particular one of said remote-controlled outlet associated with the first supply node, the inquiry specifying said particular remote-controlled outlet.

10. The method according to claim 9, wherein the activation request specifies a future point in time at which the user wishes to gain access to electric energy via the specified remote-controlled outlet specified in the activation request, the activation request further specifying a time period during which the user wishes to consume electric energy from the specified remote-controlled outlet.

11. The method according claim 10, wherein in response to said activation request specifying a future point in time at which the user wishes to gain access to electric energy via the specified remote-controlled outlet specified in the activation request, the method further comprising:
checking in the server node whether the specified remote-controlled outlet is available for the user identity associated with said activation request at said future point in time; and
making a reservation for said user identity with the specified remote-controlled outlet in the server node at said future point in time.

12. The method according to claim 9, wherein before sending the activation accept to the first supply node, the method comprising:
prompting the user of the mobile terminal to accept a tariff for consuming electric energy via the specified remote-controlled outlet.

13. The method according to claim 12, wherein, in connection with electric energy being output the specified remote-controlled outlet specified in the activation request, the method comprises:
sending from the first supply node at least one status report to the server node, the at least one status report comprising data concerning the specified remote-controlled outlet and an amount of energy consumed during a specific time period.

14. A mobile terminal for communication with a server node over a wireless interface, wherein the mobile terminal is configured to:
receive user input specifying a particular remote-controlled outlet associated with a supply node, which supply node is configured to receive electric energy from an external power source and, based thereon, provide output energy via said remote-controlled outlet, the supply node being connected to the server node via at least one communication network; and
send an activation request to the server node based on said user input, the activation request specifying said remote-controlled outlet and a user identity designating a user of one of the mobile terminals, and the activation request being configured to cause the server node to check that the user identity is authorized to activate the specified remote-controlled outlet, and provided that the user identity is found to be authorized, send an activation accept to the supply node in which the specified remote-controlled outlet specified in the activation request is included, the activation accept being configured to, upon receipt by the supply node, cause the supply node to enable output of electric energy from the specified remote-controlled outlet specified in the activation request, wherein the supply node comprises:
circuitry configured to register an impedance measure in respect to the remote-controlled outlet associated with the supply node; and
a first trigger module configured to generate an inquiry in response to a registered impedance measure indicative of an electric plug being inserted into said remote-controlled outlet associated, the inquiry specifying said remote-controlled outlet.

15. The mobile terminal according to claim 14, further configured to:
receive prompting from the server node, said prompting pertaining to an accept of a tariff for consuming electric energy via the specified remote-controlled outlet specified in the activation request;
present visual and/or acoustic information describing said tariff to the user; and
generate the activation accept in response to input from the user involving accepting said tariff.

16. A computer program product stored on a non-transitory computer readable medium associated with a mobile terminal, said computer program product is used for for providing electric energy to users, said computer program code comprising computer instructions to cause one or more computer processors to perform the operations of:
- presenting a user interface configured to receive user input specifying a particular remote-controlled outlet associated with a supply node, wherein the supply node is configured to receive electric energy from an external power source and based thereon provide output energy via said remote-controlled outlet, the supply node being connected to the server node via at least one communication network; and
- sending, in response to user input entered via said user interface, an activation request to the server node over a wireless interface, the activation request specifying said remote-controlled outlet and a user identity designating a user of one of the mobile terminal, and the activation request being configured to cause the server node to check that the user identity is authorized to activate the specified remote-controlled outlet specified in the activation request, and provided that the user identity is found to be authorized, send an activation accept to the supply node, the activation accept being configured to, upon receipt by the supply node, cause the supply node to enable output of electric energy from the specified remote-controlled outlet specified in the activation request;

wherein the supply node comprises:
- circuitry configured to register an impedance measure in respect to the remote-controlled outlet associated with the supply node; and
- a first trigger module configured to generate an inquiry in response to a registered impedance measure indicative of an electric plug being inserted into said remote-controlled outlet associated, the inquiry specifying said remote-controlled outlet.

* * * * *